United States Patent [19]

Flatt et al.

[11] Patent Number: 5,753,030
[45] Date of Patent: May 19, 1998

[54] CRYSTAL GROWTH MODIFIERS FOR PERYLENE PIGMENTS

[75] Inventors: Thomas R. Flatt, Summerville; Mark W. Johnson, Goose Creek, both of S.C.

[73] Assignee: Bayer Corporation, Pittsburgh, Pa.

[21] Appl. No.: 645,368

[22] Filed: May 13, 1996

[51] Int. Cl.$^6$ ............................................... C09B 48/00
[52] U.S. Cl. .......................... 106/495; 106/493; 106/494; 106/498; 546/37
[58] Field of Search ....................... 106/493, 494, 106/495, 498; 546/37

[56] References Cited

U.S. PATENT DOCUMENTS

| | | | |
|---|---|---|---|
| 3,877,935 | 4/1975 | Regensburger et al. | 430/58 |
| 4,432,796 | 2/1984 | Santimauro | 106/410 |
| 4,655,845 | 4/1987 | Spietschka et al. | 106/413 |
| 4,882,254 | 11/1989 | Loufty et al. | 430/59 |
| 5,453,151 | 9/1995 | Babler | 106/497 |
| 5,518,539 | 5/1996 | Hao et al. | 106/495 |

OTHER PUBLICATIONS

W. Herbst and K. Hunger, *Industrial Organic Pigments* (New York: VCH Publishers, 1993) (month unavailable) pp. 9, 447–463, 467–475, 501–505, 509–511.

H. Zollinger, *Color Chemistry* (New York: VCH Verlagsgessellschaft, 1991), month unavailable) pp. 225, 227–228, 236–240, 296–298.

*The Chemistry of Synthetic Dyes and Pigments*, ed. H.A. Lubs (Malabar, Florida: Robert E. Kriegar Publishing Company, 1955) (month unavailable) pp. 444–446, 481–482.

*Primary Examiner*—Mark L. Bell
*Assistant Examiner*—Scott L. Hertzog
*Attorney, Agent, or Firm*—Joseph C. Gil; Richard E. L. Henderson

[57] ABSTRACT

This invention relates to pigment compositions prepared by precipitating a blend of (a) about 60 to about 95 percent by weight of a perylene pigment having the formula

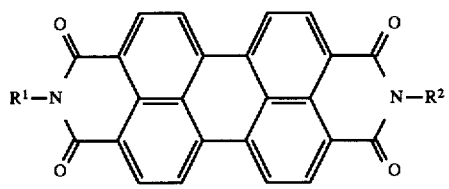

wherein $R^1$ and $R^2$ are independently $C_1$–$C_6$ alkyl, $C_5$–$C_7$ cycloalkyl, $C_7$–$C_{16}$ aralkyl, or $C_6$–$C_{10}$ aryl; and (b) about 5 to about 40 percent by weight of a polycyclic aromatic compound containing at least 5 aromatic rings wherein at least one ring is substituted with at least one keto group.

14 Claims, No Drawings

CRYSTAL GROWTH MODIFIERS FOR PERYLENE PIGMENTS

BACKGROUND OF THE INVENTION

This invention relates to pigment composition comprising co-precipitated blends of perylene pigments and polycyclic aromatic compounds.

Perylene pigments are known. E.g., W. Herbst and K. Hunger, *Industrial Organic Pigments* (New York: VCH Publishers, Inc., 1993), pages 9 and 467–475; see also H. Zollinger, *Color Chemistry* (VCH Verlagsgessellschaft, 1991), pages 227–228 and 297–298, and M.A. Perkins, "Pyridines and Pyridones" in *The Chemistry of Synthetic Dyes and Pigments*, ed. H. A. Lubs (Malabar, Florida: Robert E. Krieger Publishing Company, 1955), pages 481–482. Perylene pigments typically exhibit high tinctorial strength combined with excellent lightfastness and weatherfastness. However, improved coloristic properties would provide additional technical and commercial advantages.

It has now been found that co-precipitated blends of perylene pigment with certain polycyclic aromatic compounds, particularly certain anthanthrones, provide enhanced transparency and depth not found for the untreated perylenes.

Although conventional blends with the polycyclic aromatic pigment 4,8-dibromoanthanthrone (i.e., Pigment Red 168) have been described as useful for altering the shade of perylenetetracarboxylic acid pigments (e.g., W. Herbst and K. Hunger, *Industrial Organic Pigments* (New York: VCH Publishers, Inc., 1993), page 511), co-precipitated blends of the type described herein have not previously been reported.

SUMMARY OF THE INVENTION

This invention relates to a pigment composition comprising a co-precipitated blend comprising (a) about 60 to about 95 percent by weight (preferably 75 to 90 percent by weight) of a perylene pigment having the formula (I)

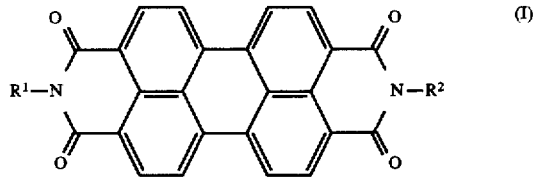

wherein $R^1$ and $R^2$ are independently $C_1$–$C_6$ alkyl, $C_5$–$C_7$ cycloalkyl, $C_7$–$C_{16}$ aralkyl, or $C_6$–$C_{10}$ aryl; and (b) about 5 to about 40 percent by weight (preferably 10 to 25 percent by weight) of a polycyclic aromatic compound, preferably a polycyclic aromatic compound selected from the group consisting of (i) an anthanthrone having the formula (II)

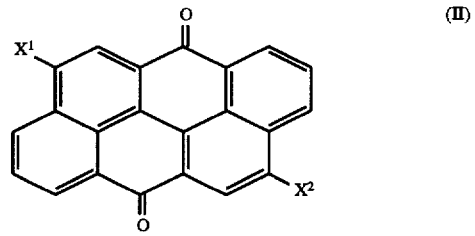

wherein $X^1$ and $X^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl, (ii) a quinacridone having the formula (III)

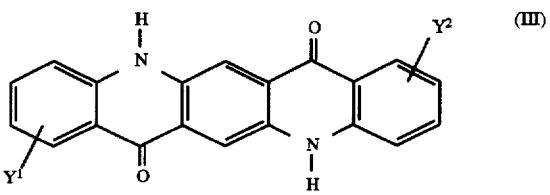

wherein $Y^1$ and $Y^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl.

(iii) a flavanthrone having the formula (IV)

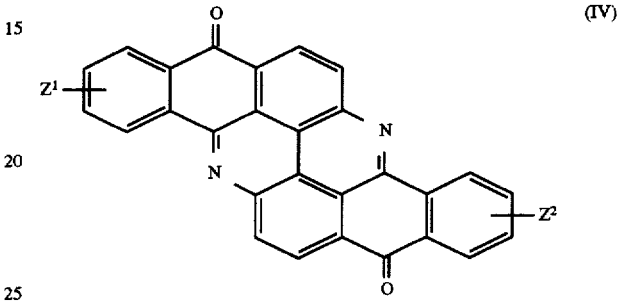

wherein $Z^1$ and $Z^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl, and (iv) mixtures thereof.

This invention further relates to a process for preparing such pigment compositions comprising (1) acid pasting or acid swelling a mixture comprising
  (a) about 60 to about 95 percent by weight (preferably 75 to 90 percent by weight) of a perylene pigment of formula (I),
  (b) about 5 to about 40 percent by weight (preferably 10 to 25 percent by weight) of a polycyclic aromatic compound, preferably a polycyclic aromatic compound of formula (II), formula (III), or formula (IV), or a mixture thereof, and
  (c) about 5 to about 25 parts by weight (preferably 9 to 15 parts by weight), relative to the total of components (a) and (b), of a strong acid (preferably concentrated sulfuric acid);

(2) drowning the mixture from step (1) by adding said mixture to about 0.5 to about 100 parts by weight (preferably 1.5 to 5 parts by weight), per part of said mixture, of a liquid in which the pigment is substantially insoluble (preferably water) (preferably at a temperature of about 0° to about 60° C.), thereby precipitating the pigment composition;

(3) isolating the pigment composition;

(4) optionally, conditioning the pigment composition.

DETAILED DESCRIPTION OF THE INVENTION

Suitable perylene pigments (a) include any of the known perylene pigments within the definition of formula (I), but preferred perylenes are symmetrical compounds in which both $R^1$ and $R^2$ are identical. Particularly preferred perylene pigments are those in which $R^1$ and $R^2$ are identical $C_1$–$C_6$ alkyl groups, most preferably methyl groups (i.e., Colour Index Pigment Red 179). Other suitable perylene pigments include those in which $R^1$ and $R^2$ are hydrogen (i.e., C.I. Pigment Violet 29), various araliphatic groups (e.g., C.I. Pigment Black 31 and 32), or various aryl groups (e.g., C.I.

Pigment Red 123, 149, 178, and 190). E.g., W. Herbst and K. Hunger, *Industrial Organic Pigments* (New York: VCH Publishers, Inc., 1993), pages 470–475.

Suitable polycyclic aromatic compounds (b) are fused ring aromatic systems containing at least five rings (preferably five to ten rings), at least one of which is substituted with one or more keto groups (preferably two keto groups such as those characteristic of quinones or analogs and derivatives thereof). Examples of suitable polycyclic aromatic compounds (b) include anthanthrones, quinacridones, and flavanthrones. It is also possible, but much less preferred, to use mixtures of various polycyclic aromatic compounds.

Preferred anthanthrones are compounds of formula (II)

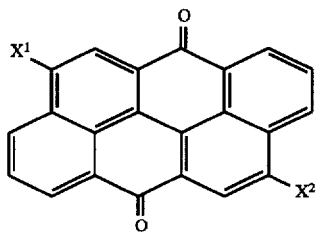

in which $X^1$ and $X^2$ are independently hydrogen or halogen, particularly those in which $X^1$ and $X^2$ are both the same halogen, most preferably bromine (i.e., 4,8-dibromoanthanthrone, or C.I. Pigment Red 168, also formerly known as Indanthrene Brilliant Orange RK). E.g., W. Herbst and K. Hunger, *Industrial Organic Pigments* (New York: VCH Publishers, Inc., 1993), pages 509–511; see also H. Zollinger, *Color Chemistry* (VCH Verlagsgessellschaft, 1991), page 225, and M.S. Whelen, "Anthanthrones" in *The Chemistry of Synthetic Dyes and Pigments*, ed. H. A. Lubs (Malabar, Florida: Robert E. Krieger Publishing Company, 1955), pages 444–446.

Preferred quinacridones are 2,9-disubstituted quinacridones of formula (IIIa)

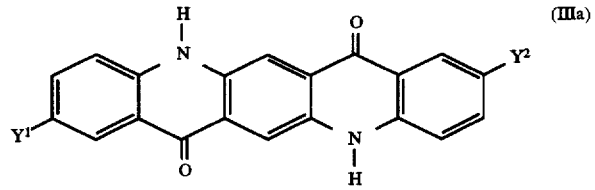

in which $Y^1$ and $Y^2$ are independently hydrogen or halogen, particularly those in which $Y^1$ and $Y^2$ are both the same halogen, most preferably chlorine (i.e., 2,9-dichloroquinacridone). E.g., W. Herbst and K. Hunger, *Industrial Organic Pigments* (New York: VCH Publishers, Inc., 1993), pages 447–463; see also H. Zollinger, *Color Chemistry* (VCH Verlagsgessellschaft, 1991), pages 236–240.

A preferred flavanthrone is unsubstituted flavanthrone of formula (IVa)

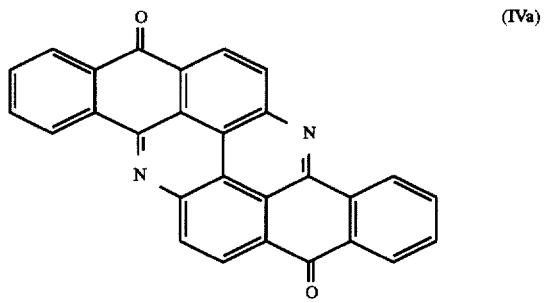

(also known as C.I. Vat Yellow 1 or Pigment Yellow 24). E.g., W. Herbst and K. Hunger, *Industrial Organic Pigments* (New York: VCH Publishers, Inc., 1993), pages 501–503 and 504–505; see also H. Zollinger, *Color Chemistry* (VCH Verlagsgessellschaft, 1973), pages 237 and 296.

As used herein, the term "$C_1$–$C_6$ alkyl" refers to straight or branched chain aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The term "$C_5$–$C_7$ cycloalkyl" refers to cycloaliphatic hydrocarbon groups having from 5 to 7 carbon atoms. Examples of $C_5$–$C_7$ cycloalkyl are cyclopentyl, cyclohexyl, and cycloheptyl. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "$C_6$–$C_{10}$ aryl" refers to phenyl and 1- or 2-naphthyl. As used herein, the term "aryl" also refers to aryl groups substituted with alkyl, alkoxy, halogen, hydroxy, alkoxycarbonyl, aryloxycarbonyl, cyano, nitro, and other known groups. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. Examples of suitable halogen are fluorine, chlorine, bromine, and iodine.

Pigment compositions of the invention are prepared by first acid pasting or acid swelling a mixture of the perylene pigment of formula (I) and the polycyclic aromatic compound of formula (II) in the specified amount of a strong acid, preferably a mineral acid such as concentrated (i.e., 96–98%) sulfuric acid, oleum, chlorosulfonic acid, or mixtures thereof. The term "acid pasting" is generally used to refer to a process in which an acidic solution containing protonated pigment is formed, whereas the term "acid swelling" generally refers to a process in which a suspension of protonated pigment is formed. The process of step (1), of course, includes the continuum ranging from completely dissolved to almost completely undissolved pigment. However, essentially complete dissolution in strong acid is generally preferred. The amount of strong acid used in step (1) is selected to insure formation of an acidic solution or suspension within a reasonable amount of time. Although step (1) can be carried out more rapidly by warming the acidic mixture (for example, to about 50° C.), it is generally preferred to use temperatures at or below 35° C. to minimize degradation of the pigment components. Regardless of which variant is used in step (1), the strongly acidic mixture is then precipitated (i.e., "drowned") in step (2) by adding the strongly acidic mixture to a liquid in which the pigment is substantially insoluble, thereby forming a co-precipitated blend according to the invention. Drowning in water is preferred, but it is also possible to use lower aliphatic alcohols (especially methanol) or other known water-miscible organic solvents, preferably in admixture with water. Although it is possible to add the drowning liquid to the acidic melt (e.g., U.S. Pat. No. 3,265,699), the present invention is preferably carried out by adding the acidic melt to the solvent (compare U.S. Pat. No. 4,100,162).

The temperature at which the drowning is carried out is generally not critical, although the temperature of the drowning liquid is usually between about 5° C. and about 65° C. In general, lower temperatures give pigments having smaller particle sizes. However, because process cycle time is also very important (because of manufacturing cost), a shorter drowning time is preferred.

The drowned pigment is then isolated in step (3) using methods known in the art, such as filtration, and then dried if desired. Other collection methods known in the art, such as centrifugation or even simple decantation, are also suitable.

The resultant co-precipitated pigment compositions do not appear to be solid solutions (as determined by X-ray crystallography) but instead appear to take the form of crystalline or partly crystalline particles containing "domains" of the perylene pigment and polycyclic aromatic compound. Although the presence of solid solution domains in small amounts is not excluded, the unique properties of the pigment compositions of the invention are not dependent on such domains.

The pigment obtained in step (3) can be conditioned in an optional step (4) using methods known in the art, such as solvent treatment or milling in combination with solvent treatment. Final particle size of the pigment can be controlled by varying the method of aftertreatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lesson or avoid flocculation, increase pigment dispersion stability, and reduce coating viscosity, such as polymeric dispersants (or surfactants). E.g., U.S. Pat. No. 4,455,173; 4,758,665; 4,844,742; 4,895,948; and, 4,895,949.

After the pigment has been isolated and optionally conditioned, the pigment can be further blended (preferably by dry blending) with one or more pigment derivatives known in the art.

Because of their light stability and migration properties, the pigment compositions of the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the pigment compositions of the present invention can have any desired shape or form.

The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Coloristic properties were evaluated using a waterborne basecoat/solvent-borne clearcoat paint system. Aqueous dispersions were prepared using a mixture of 12.4% AROLON® 559-G4-70 acrylic resin (Reichhold Chemicals, Inc., Research Triangle Park, North Carolina), 3.2% SOLSPERSE® 27000 hyperdispersant (Zeneca, Inc., Wilmington, Del.), 1.6% 2-amino-2-methyl-1-propanol (Angus Chemical, Buffalo Grove, Ill.), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries, West Patterson, N.J.), which gave a total solids content of 50%. Masstone and transparency measurements were made using films applied at 76 μm and 38 μm wet film thickness, respectively, and allowed to stand at room temperature for fifteen minutes and at 100° C. for five minutes. Clearcoats containing a mixture of 80% AROPLAZ® 1453-X-50 alkyd resin (Reichhold Chemicals) and 20% CYMEL® 325 melamine/formaldehyde resin at a total solids level of 57% were then applied over the basecoat at a 76 μm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company, Jersey City, N.J.), which gave a pigment-to-binder ratio of 1:1.1, a total solids content of 55%, and a TiO$_2$-to-pigment ratio of 90:10. Color measurements were made using films applied at 38 μm wet film thickness and allowed to stand at room temperature for fifteen minutes and at 100° C. for five minutes. Clearcoats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc., Tamaqua, Pa.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38 μm wet film thickness and baked as described above. Clearcoats were then applied and baked as described above.

Differences in hue and chroma of the masstone, undertone, and metallic paints were measured using a CS-5 Chroma Sensor (Datacolor International, Lawrenceville, N.J.).

Example 1

Example 1 illustrates the preparation of a pigment composition of the invention containing 80% by weight of a perylene pigment and 20% by weight of an anthanthrone pigment.

To 604 g of approximately 99% sulfuric acid (prepared from a mixture of 551 g of commercial 98% sulfuric acid and 100 g of 20% oleum) at 25°–30° C. was added 8 g of 4,8-dibromoanthanthrone (C.I. Pigment Red 168; available as Brilliant Orange RK from Cassella AG, Frankfurt, Germany) followed by 32 g of N,N-dimethylperylenediimide (C.I. Pigment Red 179; prepared as described in U.S. Pat. No. 3,331,847). The mixture was stirred at 25°–30° C. for 17 to 18 hours, then poured into one liter of water at 5°–10° C., the temperature being maintained at 5°–10° C. by periodic addition of ice. The mixture was heated to 90° C., then maintained at 90°–95° C. for one hour. The resultant precipitate was collected by filtration, washed with water, reslurried in 800 ml of water at a pH of 5.0–6.0, and heated to 80° C. The slurry was stirred rapidly for five minutes at 80° C. with a dispersant mixture containing 1.6 g of SOLSPERSE® 24000 (available from Zeneca, Inc., Wilmington, Del.), 0.5 g of a nonionic surfactant having an HLB value of 14 to 15, 0.6 g of glacial acetic acid, and 5.0 g of water and then for an additional fifteen minutes at 80°–85° C. with a mixture of 3.2 g of a 50% aqueous solution of the acetate salt of dehydroabietylamine, and 10 ml of water. The resultant mixture was adjusted to a pH of about 8.0–8.5 and stirred at 80°–85° C. for two hours. The solid component was collected by filtration, washed with water, and dried in an oven at 60° C. to yield 41.8 g of a pigment composition exhibiting a deep, transparent red color. Test results are shown in Table 1.

Example 2

Example 2 illustrates a preparation of a pigment composition containing 75% by weight of a perylene pigment and 25% by weight of an anthanthrone pigment.

To 99% sulfuric acid (prepared from a mixture of 1269 g of commercial 98% sulfuric acid and 231 g of 20% oleum) at 25°–30° C. was added 25 g of 4,8-dibromoanthanthrone followed by 75 g of N,N-dimethylperylenediimide. The mixture was stirred at 25°–30° C. for 17 to 18 hours, then poured into 2.5 liters of water at 5°–10° C., the temperature being maintained at 5°–10° C. for about one hour by periodic addition of ice. The mixture was heated to 80° C., then maintained at 80°–90° C. for one hour. The resultant precipitate was collected by filtration, washed with water, reslurried in two liters of water at a pH of 8–9, and heated to 50° C. The slurry was stirred rapidly for fifteen minutes with an emulsion mixture containing 30 g of petroleum distillate, 1.0 g of an anionic sulfosuccinate surfactant, and 100 g of water. The pH was adjusted to about 3.0–3.5 with dilute aqueous sulfuric acid and stirred at 50° C. for four hours. A mixture of 16 g of a 50% aqueous solution of the acetate salt of dehydro-abietylamine and 100 ml of water was added, and the resultant mixture was stirred at about 50° C. for fifteen minutes. After the pH was adjusted to about 8.5–9.5, the mixture was stirred at about 50° C. for one hour. The solid component was collected by filtration, washed with water, dried at 60° C., ground, and sifted through an 80 mesh screen to yield 106.5 g of a pigment composition exhibiting a deep red color. Test results are shown in Table 1.

Example 3 (comparison)

Example 3 illustrates the preparation of a comparison perylene pigment containing no anthanthrone pigment. The resultant pigment was used as a standard for the pigments of Examples 1 and 2 (see Table 1) and a direct comparison for Examples 4–6 (see Table 2).

To 440 g of commercial 98% sulfuric acid was added 40 g of N,N-dimethylperylenediimide. The mixture was heated to 40° C. maintained at 40°–45° C. for four hours, stirred at room temperature for 12 to 14 hours, and then poured into 800 ml of water at 5°–10° C., the temperature being maintained at 5°–10° C. by periodic addition of ice. The mixture was then stirred for about thirty minutes at 5°–15° C., heated to 60° C., and stirred for an additional thirty minutes. The resultant precipitate was collected by filtration, washed with water, reslurried in 400 ml of water at a pH of 6.5–7.5. The slurry was stirred rapidly at room temperature for fifteen minutes with an emulsion mixture containing 12.0 g of petroleum distillate, 0.4 g of an anionic sulfosuccinate surfactant, and 40 g of water, then autoclaved at 110° C. for two hours. The autoclaved mixture was poured into 800 ml of water at a pH of 4–5. A mixture of 6.4 g of a 50% aqueous solution of the acetate salt of dehydroabietylamine and 20 ml of water was added, and the resultant mixture was stirred at 80° C. for fifteen minutes. After the pH was adjusted to about 8.5–9.0, the mixture was stirred at 80°–85 C. for one hour, then cooled to a temperature of less than 70° C. by the addition of water. The solid component was collected by filtration, washed with water, and dried at 60° C. to yield 40.3 g of a pigment exhibiting inferior color properties when compared to pigment compositions prepared according to the invention.

TABLE 1

Color properties[1] for Examples 1 and 2

| Example | Masstone ΔC (chroma) | Masstone transparency | Undertone ΔH (hue) | Undertone ΔC | Undertone % strength |
|---|---|---|---|---|---|
| 1 | 0.91 | Greater | 1.10 | 3.94 | 99.41 |
| 2 | −1.95 | Greater | 1.22 | 3.56 | 102.35 |

[1]Color properties are relative to the comparison pigment of Example 3.

Examples 4–6

Examples 4–6 of the invention were carried out according to the method of comparison Example 3 except for using mixtures of N,N-dimethylperylenediimide and 4,8-dibromoanthanthrone in the amounts shown in Table 2. Test results (relative to the comparison pigment of Example 3) are also shown in Table 2.

Example 7 (comparison)

Example 7 illustrates the preparation of a comparative dry-mixed composition containing 80% by weight of a perylene pigment and 20% by weight of an anthanthrone pigment.

The process of Example 3 was repeated except for using 4,8-dibromoanthanthrone instead of N,N-dimethylperylenediimide. A 1.8 g portion of the resultant orange pigment was dry blended with 16.2 g of the perylene pigment from comparison Example 3. The resultant dry blend exhibited inferior color properties when compared to pigment compositions prepared according to Examples 4–6 of the invention. Test results are shown in Table 2.

dried at 60° C. to yield a deep red pigment. Test results are shown in Table 3.

Example 9

Example 9 illustrates the preparation of a pigment composition of the invention containing 90% by weight of a perylene pigment and 10% by weight of a flavanthrone pigment.

To 500 g of commercial 98% sulfuric acid was added 5 g of flavanthrone (available as C.I. Vat Yellow 1 from Aceto Chemicals) followed by 45 g of N,N dimethylperylenediimide. The mixture was heated to 40° C., maintained at 40°–45° C. for four hours, stirred at room temperature for 12–14 hours, and then added dropwise to one liter of water at 5°–10° C., the temperature being maintained by periodic addition of ice. The mixture was then stirred for thirty minutes at 5°–15° C., heated to 60° C., and stirred for an additional thirty minutes. The resultant precipitate was col-

TABLE 2

Quantities and color properties[1] for Examples 4–7

| | Quantities | | Masstone | Masstone | Undertone | Undertone | Undertone |
|---|---|---|---|---|---|---|---|
| Example | Perylene | Anthanthrone | ΔC (chroma) | transparency | ΔH (hue) | ΔC | % strength |
| 4 | 38 g 95% | 2 g 5% | −0.01 | Equal | 0.63 | 0.81 | 102.11 |
| 5 | 36 g 90% | 4 g 10% | −2.46 | Greater | 0.90 | 2.23 | 111.33 |
| 6 | 32 g 80% | 8 g 20% | −2.17 | Greater | 1.43 | 3.17 | 106.27 |
| 7 (comp) | 16.2 g 90% | 1.8 g 10% | 0.99 | Equal | 0.19 | 0.87 | 96.23 |

[1]Color properties are relative to the comparison pigment of Example 3.

Example 8

Example 8 illustrates the preparation of a pigment composition of the invention containing 90% by weight of a perylene pigment and 10% by weight of a quinacridone pigment.

To 440 g of commercial 98% sulfuric acid was added 36 g of N,N-dimethylperylenediimide. The mixture was heated to 40° C., maintained at 40°–45° C. for four hours, and stirred at room temperature for 12 to 14 hours. To this mixture was added 4 g of a crude dichloroquinacridone prepared according to the method described in U.S. Pat. No. 3,257,405. The resultant mixture was stirred at room temperature for one hour and then poured into 900 mL of water at 5°–10° C., the temperature being maintained by periodic addition of ice. The mixture was then stirred for about thirty minutes at 5°–10° C., heated to 60° C., and stirred for an additional thirty minutes. The resultant precipitate was collected by filtration, washed with water, reslurried in 450 ml of water at a pH of 6.5–7.5. The slurry was stirred rapidly at room temperature for fifteen minutes with an emulsion mixture containing 12.0 g of petroleum distillate, 0.4 g of an anionic sulfosuccinate surfactant, and 20 g of water, then autoclaved at 110°–115° C. for two hours. The autoclaved mixture was poured into 800 ml of water at a pH of less than 6. A mixture of 4.8 g of a 50% aqueous solution of the acetate salt of dehydroabietylamine and 20 ml of water was added, and the resultant mixture was stirred at 80°–85° C. for fifteen minutes. After the pH was adjusted to about 9.0–9.5, the mixture was stirred at 80°–85° C. for an additional fifteen minutes, then cooled to a temperature of less than 70° C. by the addition of water. The solid component was collected by filtration, washed with water, and lected by filtration, washed with water, and divided into two equal portions, each of which was reslurried in 500 ml of water.

(A) One portion of the resultant slurry was adjusted to pH 11.0–11.5, heated to 45° C., and stirred at 45°–50° C. for two hours with an emulsion mixture containing 7.5 g of petroleum distillate, 0.1 g of an anionic sulfosuccinate surfactant, and 10 g of water. After the pH was adjusted to 4.0–5.0, a mixture of 4.0 g of a 50% aqueous solution of the acetate salt of dehydroabietylamine and 10 ml of water was added and the resultant mixture was stirred at 45°–50° C. for thirty minutes. After the pH was adjusted to 8.5–9.0, the mixture was stirred at 45°–50° C. for an additional fifteen minutes. The solid component was collected by filtration, washed with water, and dried at 60° C. to yield 24.4 g of a yellowish red pigment. Test results are shown in Table 3.

(B) The second portion of the slurry described above was adjusted to pH 11.5–12.0, after which 25 g of a commercial sodium hypochlorite solution was added. The resultant mixture was stirred at 90° C. for one hour, then cooled to 45° C. and stirred at 45°–50° C. for two hours with an emulsion mixture containing 7.5 g of petroleum distillate, 0.1 g of an anionic sulfosuccinate surfactant, and 10 g of water. After the pH was adjusted to 4.0–5.0, a mixture of 4.0 g of a 50% aqueous solution of the acetate salt of dehydroabietylamine and 10 ml of water was added and the resultant mixture was stirred at 45°–50° C. for thirty minutes. After the pH was adjusted to 8.5–9.0, the mixture was stirred at 45°–50° C. for fifteen minutes. The solid component was collected by filtration, washed with water, and dried at 60° C. to yield 22.8 g of a yellowish red pigment. Test results are shown in Table 3.

TABLE 3

| | Color properties[1] for Examples 8 and 9 | | | | |
|---|---|---|---|---|---|
| Example | Masstone ΔC (chroma) | Masstone transparency | Undertone ΔH (hue) | Undertone ΔC | Undertone % strength |
| 8 | −1.69 | Greater | 0.57 | 2.24 | 105.87 |
| 9(A) | −1.16 | Less | 0.14 | 0.87 | 110.27 |
| 9(B) | −0.57 | Equal | 2.27 | 1.07 | 103.34 |

[1]Color properties are relative to the comparison pigment of Example 3.

What is claimed is:

1. A pigment composition comprising a co-precipitated blend comprising (a) 60 to 95 percent by weight of a perylene pigment having the formula

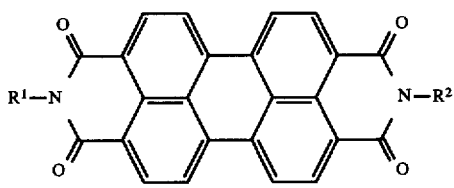

wherein $R^1$ and $R^2$ are independently $C_1$–$C_6$ alkyl, $C_5$–$C_7$ cycloalkyl, $C_7$–$C_{16}$ aralkyl, or $C_6$–$C_{10}$ aryl; and (b) 5 to 40 percent by weight of a polycyclic aromatic compound containing at least five aromatic rings wherein at least one such aromatic ring is substituted with one or more keto groups.

2. A pigment composition according to claim 1 wherein the polycyclic aromatic compound is (i) an anthanthrone having the formula

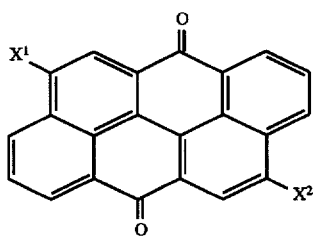

wherein $X^1$ and $X^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl, (ii) a quinacridone having the formula

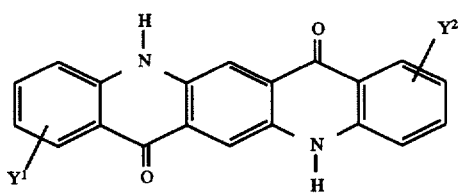

wherein $Y^1$ and $Y^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl, or (iii) a flavanthrone having the formula

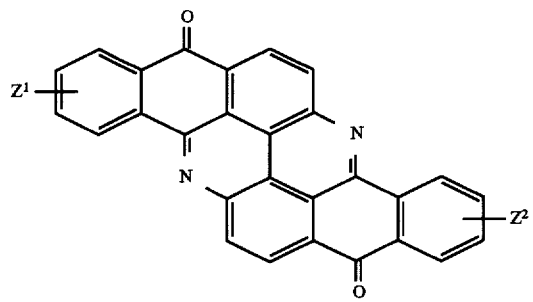

wherein $Z^1$ and $Z^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl.

3. A pigment composition according to claim 1 wherein the co-precipitated blend comprises 75 to 90 percent by weight of perylene pigment (a) and 10 to 25 percent by weight of polycyclic aromatic compound (b).

4. A pigment composition according to claim 1 wherein the polycyclic aromatic compound is an anthanthrone having the formula

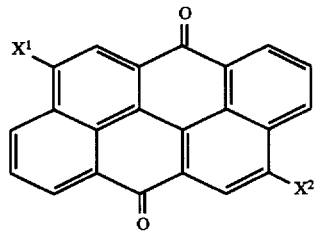

wherein $X^1$ and $X^2$ are independently hydrogen or halogen.

5. A pigment composition according to claim 1 wherein the polycyclic aromatic compound is 4,8-dibromoanthanthrone.

6. A pigment composition according to claim 1 wherein the polycyclic aromatic compound is a 2,9-disubstituted quinacridone having the formula

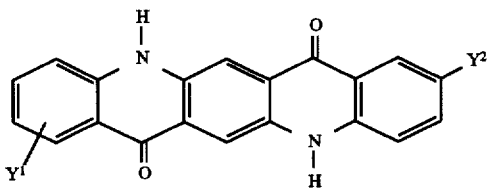

wherein $Y^1$ and $Y^2$ are independently hydrogen or halogen.

7. A pigment composition according to claim 1 wherein the polycyclic aromatic compound is 2,9-dichloroquinacridone.

8. A pigment composition according to claim 1 wherein the polycyclic aromatic compound is unsubstituted flavanthrone having the formula

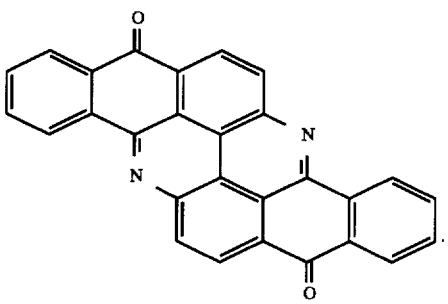

9. A process for preparing a pigment composition according to claim 1 comprising (1) acid pasting or acid swelling a mixture comprising
  (a) 60 to 95 percent by weight, relative to the total weight of components (a) and (b), of a perylene pigment of formula

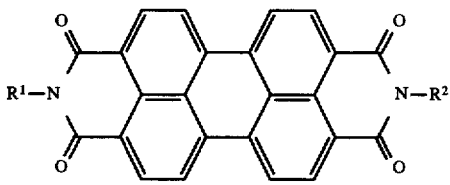

wherein $R^1$ and $R^2$ are independently $C_1$–$C_6$ alkyl, $C_5$–$C_7$ cycloalkyl, $C_7$–$C_{16}$ aralkyl, or $C_6$–$C_{10}$ aryl; and (b) 5 to 40 percent by weight, relative to the total weight of components (a) and (b), of a polycyclic aromatic compound containing at least five aromatic rings wherein at least one such aromatic ring is substituted with one or more keto groups;

with 5 to 25 parts by weight, relative to the total weight of components (a) and (b), of a strong acid;

(2) drowning the mixture from step (1) by adding said mixture to 0.5 to 100 parts by weight, per part of said mixture, of a liquid in which the pigment is substantially insoluble, thereby precipitating the pigment composition;

(3) isolating the pigment composition;

(4) optionally, conditioning the pigment composition.

10. A process according to claim 9 wherein the polycyclic aromatic compound is (i) an anthanthrone having the formula

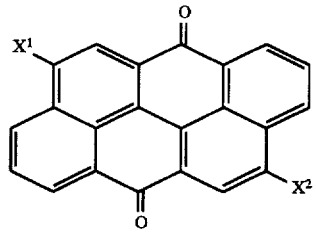

wherein $X^1$ and $X^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl, (ii) a quinacridone having the formula

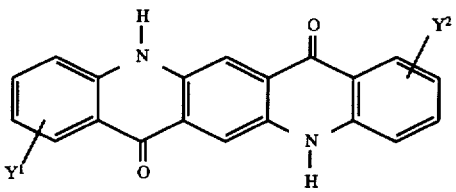

wherein $Y^1$ and $Y^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl, or (iii) a flavanthrone having the formula

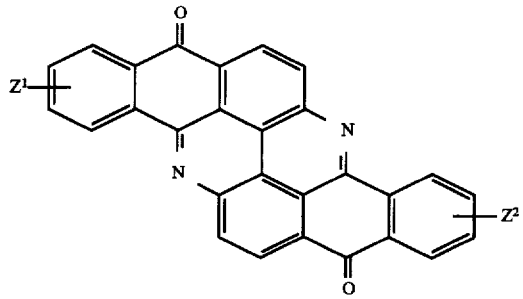

wherein $Z^1$ and $Z^2$ are independently hydrogen, halogen, $C_1$–$C_6$ alkyl, $C_1$–$C_6$ alkoxy, $C_7$–$C_{16}$ aralkyl, or $C_6$–$C_{10}$ aryl.

11. A process according to claim 9 wherein the mixture used in step (1) comprises 75 to 90 percent by weight, relative to the total weight of components (a) and (b), of perylene pigment (a) and 10 to 25 percent by weight, relative to the total weight of components (a) and (b), of polycyclic aromatic compound (b).

12. A process according to claim 9 wherein the strong acid used in step (1) is concentrated sulfuric acid, oleum, or a mixture thereof.

13. A process according to claim 9 wherein 9 to 15 parts by weight, relative to the total weight of components (a) and (b), of a strong acid is used in step (1).

14. A process according to claim 9 wherein the liquid used in drowning step (2) is water.

* * * * *

UNITED STATES PATENT AND TRADEMARK OFFICE
CERTIFICATE OF CORRECTION

PATENT NO.   : 5,753,030
DATED        : May 19, 1998
INVENTOR(S)  : Thomas R. Flatt and Mark W. Johnson It is certified that error appears in the above-identified patent and that said Letters Patent is hereby corrected as shown below:

<u>Column 9,</u>
Line 8, delete "80%" and insert -- 90% --.
Line 9, delete "20%" and insert -- 10% --.

Signed and Sealed this

Ninth Day of April, 2002

Attest:

JAMES E. ROGAN
Attesting Officer — Director of the United States Patent and Trademark Office